US006618387B1

United States Patent
Liu et al.

(10) Patent No.: US 6,618,387 B1
(45) Date of Patent: Sep. 9, 2003

(54) INTERFACE FOR ABSTRACTING CONTROL OF A CABLE MODEM

(75) Inventors: Jun Liu, Redmond, WA (US); John M. Parchem, Seattle, WA (US); Daniel J. Shoff, Issaquah, WA (US); Sureshkumar Natarajan, Bellevue, WA (US); Soemin Tjong, Redmond, WA (US)

(73) Assignee: WEBTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/371,915

(22) Filed: Aug. 10, 1999

Related U.S. Application Data
(60) Provisional application No. 60/122,859, filed on Mar. 4, 1999.

(51) Int. Cl.[7] ................................. H04L 12/66
(52) U.S. Cl. ................. 370/401; 370/469; 370/487; 725/111
(58) Field of Search ................. 370/401, 419, 370/420, 421, 428, 469, 486, 487, 490, 389; 725/51, 109, 111

(56) References Cited

U.S. PATENT DOCUMENTS

| | | | | | |
|---|---|---|---|---|---|
| 5,742,607 | A | * | 4/1998 | Beighe et al. | 370/419 |
| 5,809,252 | A | * | 9/1998 | Beighe et al. | 709/227 |
| 5,912,896 | A | * | 6/1999 | Beighe et al. | 370/463 |
| 6,058,421 | A | * | 5/2000 | Fijolek et al. | 709/225 |
| 6,236,653 | B1 | * | 5/2001 | Dalton et al. | 370/352 |
| 6,295,554 | B1 | * | 9/2001 | Karadogan et al. | 709/219 |
| 6,370,147 | B1 | * | 4/2002 | Beser | 370/401 |
| 6,421,728 | B1 | * | 7/2002 | Mohammed et al. | 709/227 |
| 6,452,923 | B1 | * | 9/2002 | Gerszberg et al. | 370/352 |
| 6,466,986 | B1 | * | 10/2002 | Sawyer et al. | 709/245 |
| 6,484,210 | B1 | * | 11/2002 | Adriano et al. | 709/239 |

OTHER PUBLICATIONS

Cerf, V., "The Catenet Model for Internetworking," Information Processing Techniques Office, Defense Advanced Research Projects Agency, IEN 48, Jul. 1978.
Bolt Beranek and Newman, "Specification for the Interconnection of a Host and an IMP," BBN Technical Report 1822, Revised May 1978.
Postel, J., "Internet Control Message Protocol—DARPA Internet Program Protocol Specification," RFC 792, USC/Information Sciences Institute, Sep. 1981.
Shoch, J., "Inter–Network Naming, Addressing, and Routing," COMPCON, IEEE Computer Society, Fall 1978.
Postel, J., "Address Mappings", RFC 796, USC/Information Sciences Institute, Sep. 1981.
Shock, J., "Packet Fragmentation in Inter–Network Protocols," Computer Networks, v. 3, n. 1, Feb. 1979.

(List continued on next page.)

Primary Examiner—Min Jung
(74) Attorney, Agent, or Firm—Workman, Nydegger & Seeley (57) ABSTRACT

Provided is a system and method for integrating a cable modem with a host customer premises equipment, such as a computer or set top box. An interface is provided which receives data packets from the cable modem of any manufacturer and transmits the data packet to a media access control layer. The media access control layer determines the destination of the data packet and forwards it to that destination, which may be the cable modem or may be the host computer of the cable modem or any other customer premises equipment networked with the host computer. The interface also receives data packets from the media access control layer and transmits the data packets to the cable modem for transmission upstream. The interface abstracts the control of the cable modem to the media access control layer. The system maintains a protocol stack for the cable modem that is separate from the protocol stack associated with the operating system of the host computer. The cable modem and the host computer are separately addressable by the cable network. Furthermore, the cable modem shares the processor and resources of the host computer.

20 Claims, 5 Drawing Sheets

OTHER PUBLICATIONS

Strazisar, V., "How to Build a Gateway," IEN 109, Bolt Beranek and Newman, Aug. 1979.

Postel, J., "Service Mappings," RFC 795, USC/Information Sciences Institute, Sep. 1981.

Postel, J., "Assigned Numbers," RFC 790, USC/Information Sciences Institute, Sep. 1981.

"MCNS Data–Over–Cable Service Interface Specifications: Baseline Privacy Interface Specification SP–B-PI–I02–990319", Mar. 1999.

"MCNS Data–Over–Cable Service Interface Specifications: Cable Modem to Customer Premise Equipment Interface Specification SP–CMCI–I04–000714", Jul. 2000.

"Data–Over–Cable Service Interface Specifications: Cable Modem Termination System—Network Side Interface Specification, SP–CMTS–NSII01–960702", Jul. 1996.

Ciciora, W., et al., "Protocol Issues," *Modern Cable Television Technology: Video, Voice, and Data Communications,* Section 4.4, pp. 194–205, Copyright 1999 by Morgan Kaufmann Publishers, Inc.

Ciciora, W., et al, "Chapter 4.5: The DOCSIS Protocol for Cable Modems," *Modern Cable Television Technology: Video, Voice, and Data Communications,* Section 4.5, pp. 205–213, Copyright 1999 by Morgan Kaufmann Publishers, Inc.

* cited by examiner

INTERFACE FOR ABSTRACTING CONTROL OF A CABLE MODEM

RELATED APPLICATIONS

This application claims the benefit of U.S. Provisional Application No. 60/122,859, filed Mar. 4, 1999, which is incorporated herein by reference.

BACKGROUND OF THE INVENTION

1. The Field of the Invention

The present invention relates to cable modems. More specifically, the present invention relates to an interface between the physical layer and the data link layer of the cable modem protocol stack and to placing data on and retrieving data from a cable modem.

2. The Prior State of the Art

The Internet is a worldwide interconnection of networks over which computers can exchange information. Never before have human beings had access to so much information from the comfort of their own homes or offices. For Wide Area Networks (WANs) such as the Internet, a computer typically employs a modem to send information to and receive information from other connected computers. There are many types of modems each corresponding to a specific type of medium used to deliver this information.

One common modem uses Plain Old Telephone Service (POTS) to send and receive information. POTS modems have an advantage in that they use a transmission medium that is available by just connecting the modem with the nearest phone jack. Thus, the POTS modem does not require expensive capital investment to set up a connection to the Internet. Although POTS modems are easy and inexpensive to connect to the Internet, the transmission speeds available over plain old telephone service are relatively slow. Currently, POTS modems are capable of information exchange at up to only 56,000 bits per second (bps) or approximately 0.056 megabits per second (Mbps). While faster POTS modems may eventually become available, it is not currently anticipated that POTS modems can become significantly faster due to physical limitations in the telephone lines themselves.

Telephone companies are now offering services that bypass the relatively slow telephone lines to establish a more direct connection to the Internet. For example, T1 connections permit information exchange in the megabit per second range. T2 and T3 connections allow for even higher speed information exchange. Currently, T1, T2 and T3 connections respectively permit information exchange at approximately 1.544 Mbps, 6.312 Mbps and 44.736 Mbps. Although these direct T1, T2 and T3 connections permit information exchange orders of magnitude faster than is available over plain old telephone service, they are typically much more expensive to obtain and/or maintain than plain old telephone service since each connection requires dedicated circuitry. Furthermore, telephone companies typically provide both the plain old telephone service and the T1, T2 and T3 connections. To facilitate free market competition, it would be desirable for a consumer to have alternative suppliers of Internet access.

A cable modem is a device that hooks up to the Internet through a cable system provided by a cable supplier. Assuming that the cable supplier facilitates Internet access as many cable suppliers are want to do, Internet access is obtained by plugging the cable modem into a cable connection that typically already exist (or may be readily installed) in many homes and business. Thus, the cost of connecting a cable modem to the Internet is relatively small compared to establishing T1, T2 and T3 connections since the extensive cable network that supports communication already exists. Thus, there is no need to establish extensive dedicated circuitry to support each new end user.

Furthermore, dialing into the Internet is not needed since data may be communicated to or from the end-user over the cable system without dialing into the cable system. A cable modem network is a connectionless system, whereas the telephone system is a connection oriented service. In a connectionless system, information is passed when information is available and the system resources are available to other users the rest of the time. In contrast, a connection oriented system sets up a connection which is set up and torn down for each communication. For instance, most internet users, when internet access is desired, must place a call to an Internet service provider to establish a connection. Once the connection is established, the user can access the internet. When the user is finished, the connection is terminated by hanging up. This is not the case with cable modems because a cable modem user has no need of dialing into an Internet service provider because the user appears to be connected at all times. The initial connection to the Internet is much faster compared to using plain old telephone service.

In addition, cable modems allow for much faster information exchange than is available over plain old telephone service. An individual cable modem end user may experience information exchange speeds of from 0.5 Mbps to 1.0 Mbps or more depending on the cable network architecture and traffic load. This represents a speed that is at least an order of magnitude faster than is currently available over plain old telephone service. Furthermore, cable information exchange speeds may be further increased due to future improvements in cable technology. Thus, cable modems provide a low cost, high-speed alternative for Internet access.

In a typical cable modem configuration, the cable modem is external to and separately addressable from the end user's computer system. The end user's computer is then connected to the cable modem using, for example, a network card. One reason for which the cable modem is external to the end-user's computer is that the cable modem may have access control settings that are to be set by the cable operator, not by the end-user. For example, the cable operator may want to prohibit access to certain services unless the end-user has communicated a subscription to the cable indicating a willingness to abide by certain terms. Allowing the end-user to directly access and set these access control settings would bypass the very purpose for having the access control settings. Thus, having the cable modem be external to the end-user's computer has the advantage of the cable operator retaining control of the access control settings within the cable modem.

Communication over a cable network using a cable modem is typically performed using a standard such as the well-known Data Over Cable Service Interface Specification (DOCSIS) 1.0 standard, which establishes uniform data transmission standards. The DOCSIS standard is managed by the Multimedia Cable Network System (MCNS), an organization formed by major cable operators.

Because the cable modem is external, the cable modem does not use the processing capability of the central processing unit (CPU) of the end user's computer. Also, the cable modem does not share memory with the end user's computer. Thus, the cable modem has its own CPU and memory which increases the cost of the cable modem.

Because the cable modem is typically external to an end user's computer or other equipment and because the cable modem has controls which are set by the company providing the cable service, the development of cable modems has not been uniform. This non-uniformity has been a roadblock to the integration and interoperability of cable modems with, for example, a computer or a set top box. There are computers or other equipment which provide a cable modem in the same box, but the computer and the cable modem are not truly integrated because the cable modem and the computer do not share the same processor or memory.

In would be an advancement in the art to integrate a cable modem with a computer or a set top box or other equipment. Additionally, it would be an advancement in the art to provide an interface such that a cable modem of any manufacturer can be used in a particular computer or set top box and can be used in more than one cable network. Thus, what is desired is a computer system that integrates a cable modem with customer premises equipment in a manner that preserves the advantages of an external cable modem, reduces cost and standardizes the transfer of data from the cable modem to the customer premises equipment.

SUMMARY AND OBJECTS OF THE INVENTION

The present invention provides for integrating a cable modem with a customer premises equipment in a system where, in a preferred embodiment, the cable modem and the customer premises equipment share a processor and resources. As used herein, the term "customer premises equipment" (CPE) refers to any electronic device, such as a computer, a set top box, or the like, that uses a cable modem to access network resources or communicate with other networked components.

Because a cable modem has typically been built as an external device related to computers, set top boxes and other equipment, manufacturers of cable modems have implemented cable modem protocol in varied manners when designing the cable modems. The present invention provides for integrating the cable modem with a CPE or a host, but the DOCSIS standard has not previously had any specifications for a cable modem that is integrated with a customer premises equipment (CPE) such as a computer or a set top box.

The protocol stack of a cable modem is related to the well-known open systems interconnection (OSI) model. The relevant layers include the physical layer (layer 1), the data link layer (layer 2), and the network layer (layer 3). The physical layer is primarily the hardware associated with the cable modem and the data link layer is typically represented by a media access controller management unit. The network layer and higher layers essentially conform to standards of other networks and are not specific to cable modems.

The present invention defines an interface which serves to transfer data packets between the physical layer, which is represented by the cable modem, to a media access controller (MAC) management unit, which implements the data link layer. Because cable modems are not uniform, the present invention defines an interface to transfer the data packets between the cable modem and the MAC management unit. In a sense, the interface, also referred to as the hardware abstraction layer, separates the functions of the hardware from the software. Thus, the interface performs a portion of the functions associated with each of physical layer and the data link layer. The interface permits cable modems to be used in any host computer having the hardware abstraction layer, so long as the cable modem complies with the requirements of the interface.

Through the interface, the media access controller management unit governs the function of the cable modem. The interface handles the hardware specific functions of the media access controller management unit and exports its services to the media access controller management unit. In this manner, information can be transmitted, in a standardized method, from the cable modem to the media access controller management unit. In addition, the hardware abstraction layer enables interoperability between various cable modems and host computers without the designers or manufacturers of the cable modems and host computers needing to understand the internal, and sometimes proprietary, features other components in the system.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

As an external device, a cable modem has its own processor, memory and protocol stack. This arrangement exists in part to ensure than an end user cannot alter the settings of the cable modem and receive services which have not been properly obtained. Also, an external modem is separately addressable from customer premises equipment and messages intended for the cable modem will not be received by the end user. Integration of a cable modem with a customer premises equipment is difficult in part because of these and other functions and advantages of an external cable modem.

The present invention provides for the integration of a cable modem and a customer premises equipment (CPE) such as a computer, a computer network, a set top box, or other equipment while maintaining the advantages of an external cable modem. The integration of a cable modem and a CPE indicates that the cable modem and the CPE will be bundled into a single device and will share both the resources and processor of the device and that the proprietary interest of the cable supplier in the function of the cable modem is protected.

While cable modems in general adhere to the DOCSIS protocol, the DOCSIS protocol does not address a situation where the cable modem and the customer premises equipment are integrated into a single unit or system. The present invention provides a cable modem driver which implements, as near as possible, the requirements of the DOCSIS protocol. To meet the requirements of DOCSIS, the CPE or host must provide for multiplexing the cable modem hardware and protocol stack with other internal clients as well as external clients. Thus the integrated CPE maintains a separate protocol stack for the cable modem, and the cable modem has a separate address. Further, precautions are taken to ensure that the CPE cannot change the parameters of the cable modem, thereby protecting the proprietary interest of the cable provider in the cable modem.

A primary responsibility of the cable modem driver is sending and receiving packets of data. When a packet arrives at the cable modem, the cable modem driver checks the packet to determine the destination of the packet. If the destination of the packet is one of the host computer or any other CPE networked with the host computer, the data packet is forwarded from the cable modem driver to the appropriate recipient via a virtual bridge. Because the cable modem is separately addressable from the host CPE, packets intended for the cable modem driver can be separated from data packets intended for the host computer and any other networked CPEs.

In order to successfully integrate a cable modem with a CPE and provide wide interoperability, it is desirable to overcome the non-uniformity of cable modems, while still conforming to DOCSIS specifications. This is accomplished according to the invention by providing an interface which separates the hardware of the cable modem from the software of the cable modem protocol stack. The interface is responsible for retrieving packets from the cable modem hardware and for placing packets from the cable modem driver or the CPE on the cable modem. The interface creates a standard that permits a cable modem to function with more than one type of host computer and further allows more than one type of cable modem to operate with any particular host computer so long as the cable modem appropriately presents the packet to the hardware abstraction layer interface.

The invention is described in terms of diagrams and flow charts. Using the diagrams and flow charts in this manner to present the invention should not be construed as limiting its scope. The embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer, such as one included in a set top box. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Although not required, the invention can be described in the general context of computer-executable instructions, such as program modules, being executed by one or more processors included in CPE. Generally, program modules include routines, programs, objects, components, data structures, etc. that perform particular tasks or implement particular abstract data types. Moreover, those skilled in the art will appreciate that the invention may be practiced with other computer system configurations, including general purpose computers, personal computers, hand-held devices, multi-processor systems, microprocessor-based or programmable consumer electronics, network PCs, minicomputers, mainframe computers, and the like.

Figure 1:
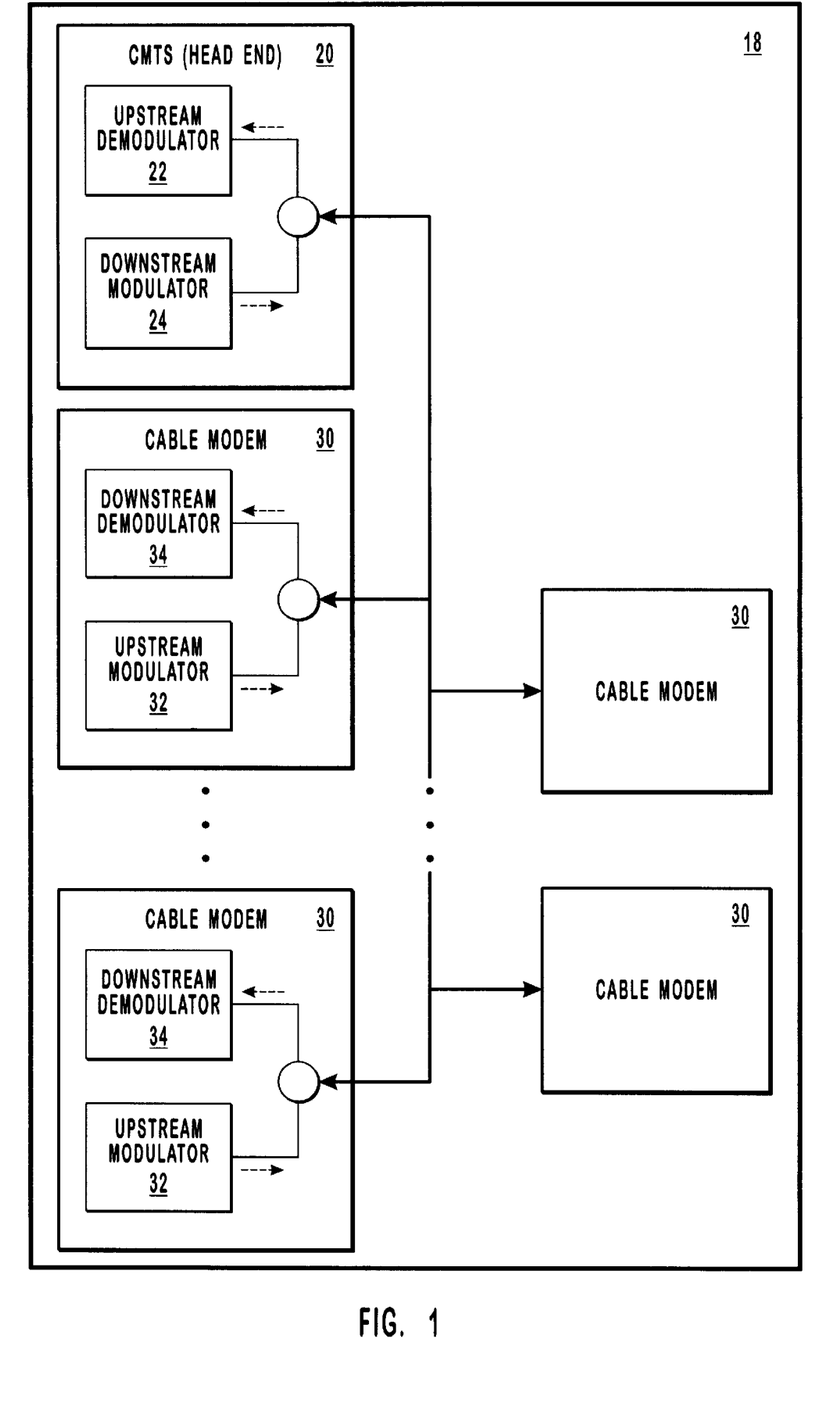
FIG. 1 is a block diagram illustrating transmission of data from a cable head end to any of a plurality of cable modems.

FIG. 1 illustrates the general operation of cable modems in a typical cable network that supports transmission of data. Cable Modem Termination System (CMTS) 20 provides service and is connected to one or more cable modems 30. CMTS 20 is also referred to as the head end of the system, and is typically operated and maintained by the cable operator. Cable network 18 illustrated in FIG. 1 is similar to a local area computer network (LAN), but the method of communication is distinct.

Communication in cable network 18 can occur either downstream or upstream. Downstream communication occurs from CMTS 20 to cable modem 30. CMTS 20 typically has a downstream modulator 24 which places the data or information in cable network 18. Cable modem 30 has a downstream demodulator 34 to retrieve the information placed in cable network 18. Upstream communication occurs from cable modem 30 to CMTS 20 in a similar manner. Cable modem 30 has an upstream modulator 32 to place the data or information in cable network 18 and CMTS 20 has an upstream demodulator 22 to retrieve the information from the cable network.

The downstream communication is from CMTS 20 to all cable modems 30, but the upstream communication is from a cable modem 30 to CMTS 20. In order for one cable modem to communication with another cable modem, the communication typically travels through CMTS 20. In the downstream direction, the data is modulated and placed, for example, on a channel having a 6 MHz bandwidth between the frequencies of 50 and 750 MHz. Another channel with a frequency typically between 5 to 42 MHz is utilized for upstream communication.

The cable system of FIG. 1 is typically designed to comply with the DOCSIS standard, which establishes a uniform protocol for transmitting data in cable networks, such that cable modems in one cable system will function in another cable system. The DOCSIS standard details a protocol between cable modem 30 and CMTS 20 as well as security in the cable system. However, cable modem implementation has usually been outside of a host device, or a customer premises equipment (CPE), and DOCSIS does not presently address host side implementation of a cable modem where the cable modem is integrated with the CPE.

Figure 2:
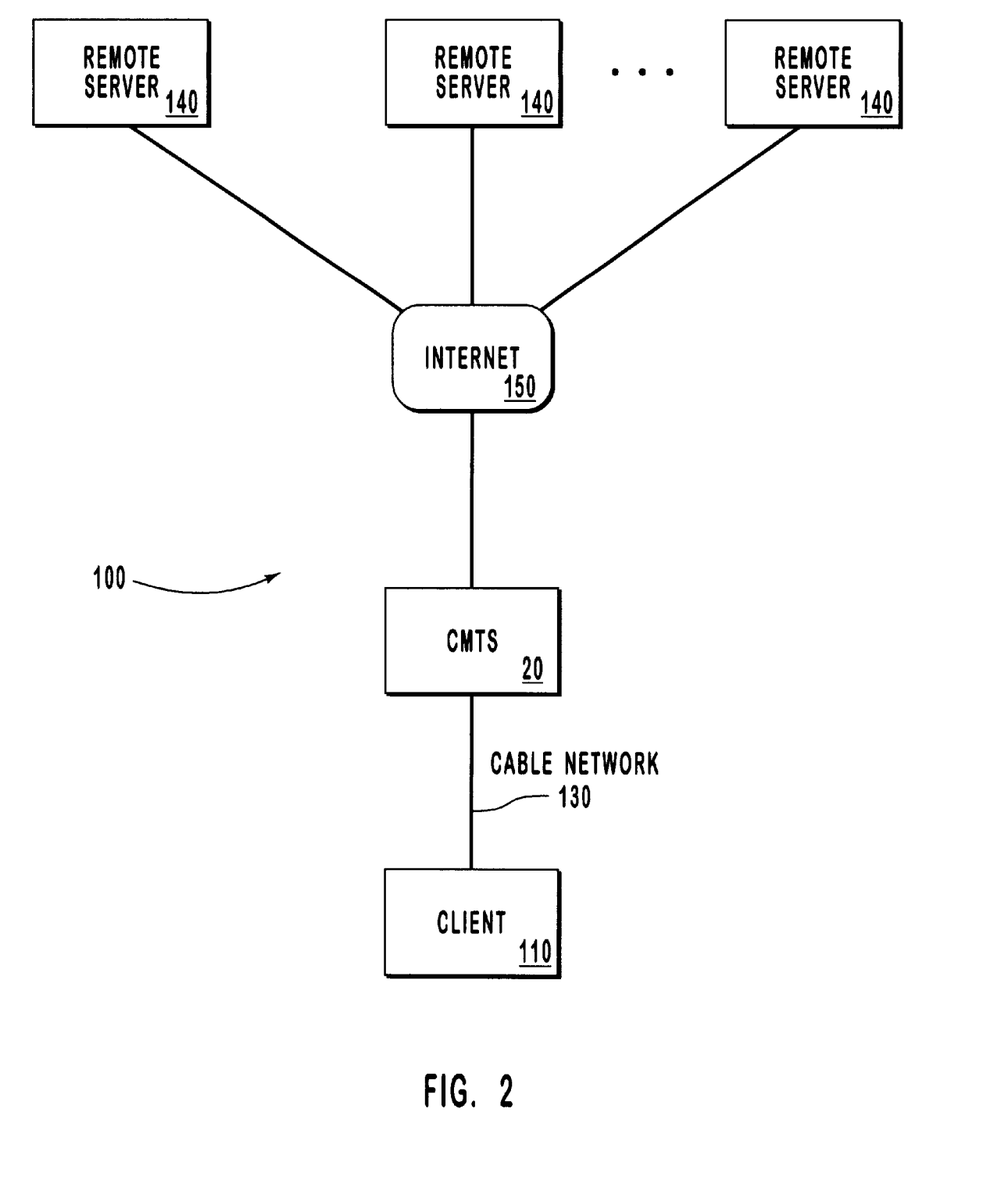
FIG. 2 is a schematic drawing of a network system that provides a suitable operating environment for the present invention.

FIG. 2 illustrates an exemplary network whereby any of the cable modems 30 of FIG. 1 can provide access for clients to the Internet or an Intranet or other networks and combinations of networks. In FIG. 2, CMTS 20 is connected by cable network 130 to client 110, which includes an integrated cable modem. CMTS and cable network 130 provide transmission services whereby client 110 can gain access to Internet 150 and any of remote servers 140. In this manner, client 110 can communicate with remote servers 140 to retrieve information associated with the World Wide Web, to send and receive e-mail, or to perform any other functions that may be associated with Internet access.

Figure 3:
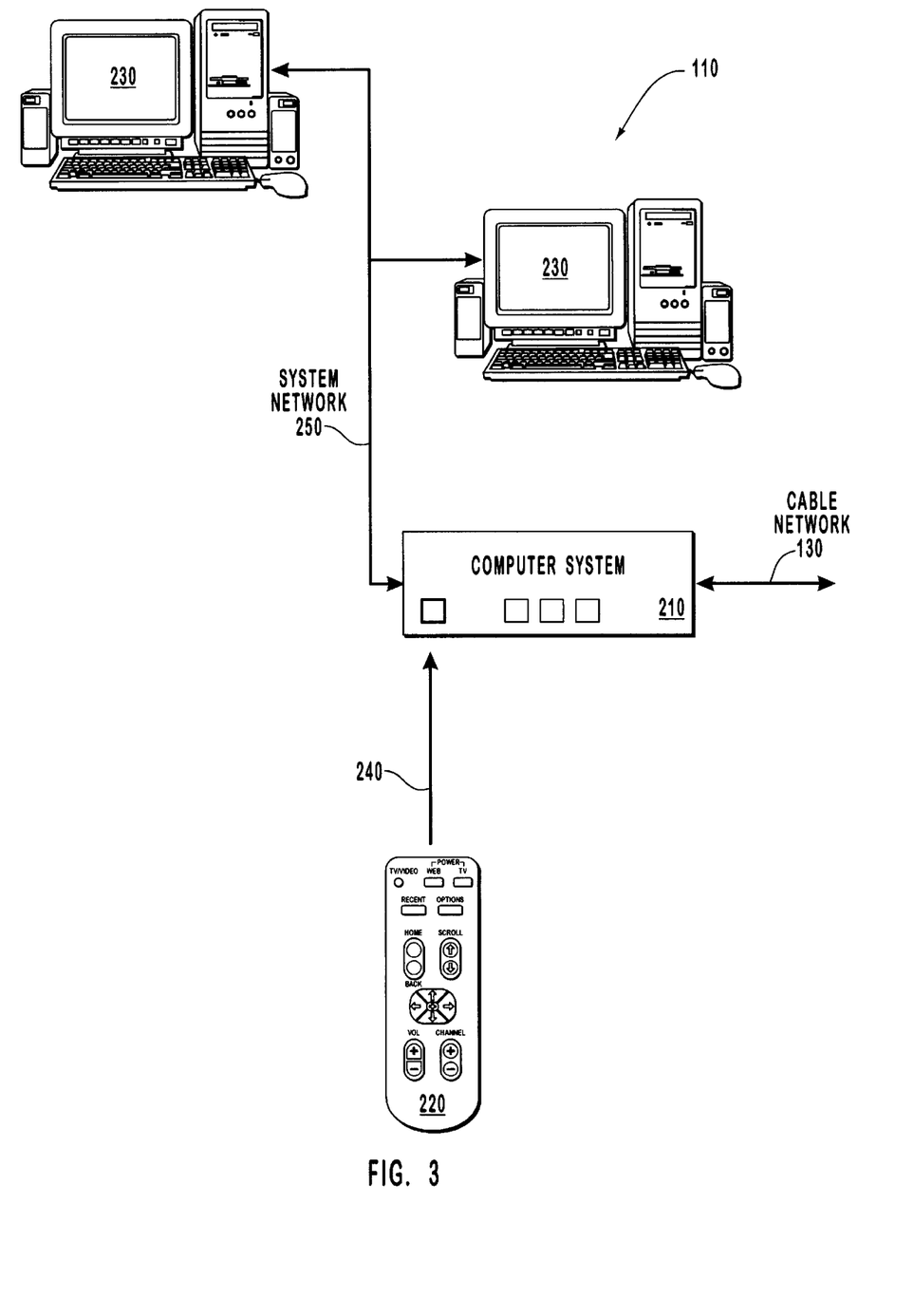
FIG. 3 is a schematic drawing of a client of FIG. 1 in which the present invention can be implemented.

FIG. 3 illustrates the client 110 of FIG. 2 in which embodiments of the present invention may be implemented. The client 110 includes a host computer system 210 (which can be characterized as a CPE), an input device 220, and one or more items of CPE 230 that are networked with the host computer system. The host computer system 210 may be a set top box, a personal computer, a workstation, a network computer, or any other special purpose or general purpose computer system capable of performing steps and acts of the present invention. Host computer system 210 has integrated therewith a cable modem according to the principles of the invention disclosed herein.

The input device 220 may be any device capable of generating control information and passing that information to the computer system 210 over an input link 240. For example, the input device 220 may be a keyboard, a mouse, a joystick, a remote control, or the like. If the input device 220 is a remote control, for example, the input link 240 would be an Infrared link. The input device 220 may also be integrated with the computer system 210 as desired.

The computer system 210 in FIG. 3 is connected to one or more items of customer premises equipment 230. For example, the customer premises equipment 230 may include personal computers, television sets, set-top boxes, workstations, network computers, or other electronic equipment.

For incoming data from the cable network 130, depending on the network address provided with the incoming data, the computer system 210 either consumes the data itself, or passes the data to one or more of the items of customer premises equipment 230 over a system network 250. Although only one system network 250 is shown, the computer system 210 may use multiple system networks to communicate with customer premises equipment 230. For example, the system network 250 may be any medium capable of communicating information to and from the computer system 210 including one or more of an Ethernet, a Universal Serial Bus (USB), a fire wire (i.e. the IEEE 1394 standard), or any other equivalent medium.

For outgoing data to the cable network 130, the computer system 210 uploads data onto the cable network 130. The outgoing data was either generated internal to the computer system 210 or was received over the system network 250 from one of the items of customer premises equipment 230.

As detailed previously, there are many reasons why a cable modems have not conventionally been implemented in a host computer. In those situations where the host and the cable modem have been integrated, the cable modem is designed to have its own processing unit and memory separate from the processing unit and memory of the host. One reason that cable modems are typically separate from hosts or CPEs is the need to send DOCSIS related messages to the cable modem while sending user data to the host. In other words, the CPE and the host are separately addressable by the cable or computer network.

Figure 4:
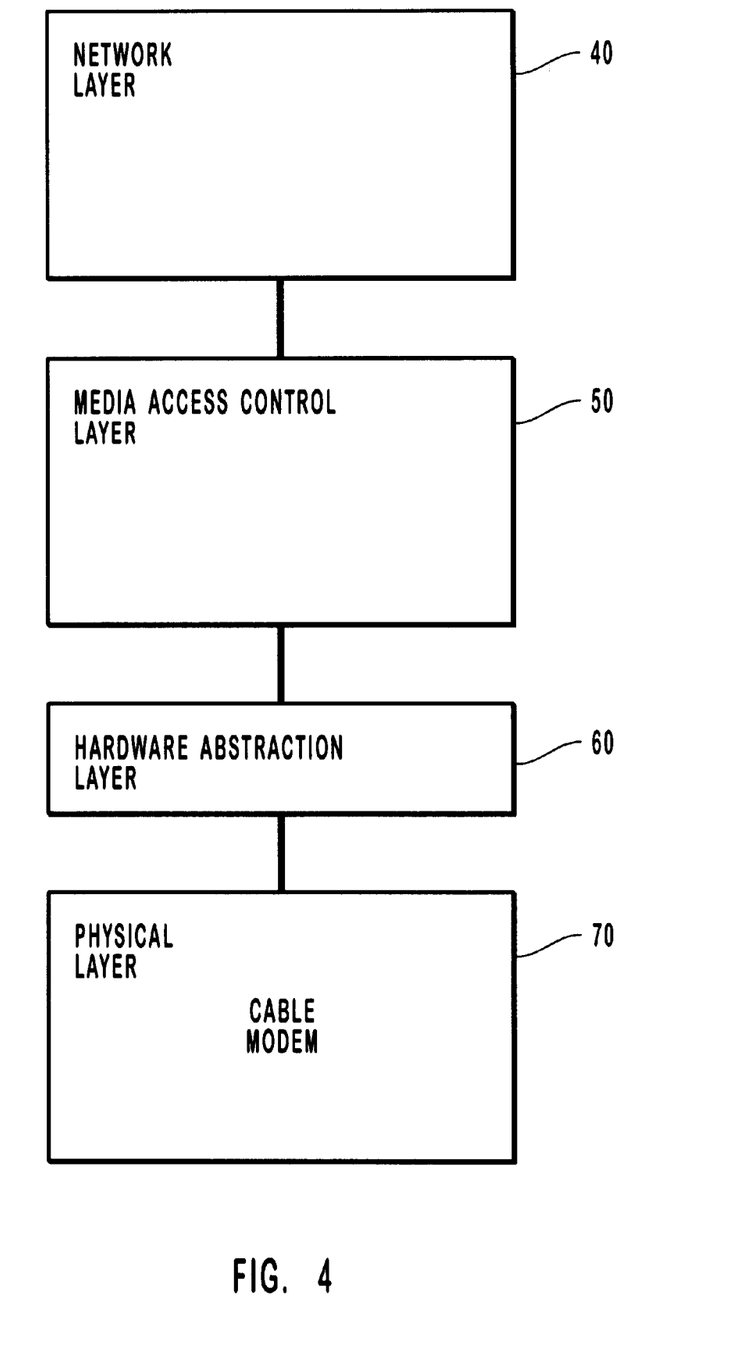
FIG. 4 is a block diagram of a protocol stack implemented by an integrated system of a cable modem and a customer premises equipment.

In accordance with the systems and methods of the present invention, FIG. 4 illustrates a block diagram of one embodiment of a protocol for host side implementation of a cable modem. A more detailed discussion of a presently preferred implementation of the protocol is described in FIG. 5. The first layer of the cable modem protocol illustrated in FIG. 4 is physical layer 70. Physical layer 70 typically defines the functions necessary to transfer data from the CMTS and the cable transmission medium to a cable modem. Included in the physical layer is the modulation format and the channel over which the data will be transmitted. The physical layer complies with DOCSIS specifications in this embodiment. A cable modem is an exemplary embodiment of physical layer 70.

Network layer 40 corresponds to the third layer of the open standards interconnection (OSI) model. Network layer 40 and higher protocol layers essentially merge with other standards and are not completely specified in the DOCSIS standard. Typically, network layer 40 is the Internet Protocol (IP) and functions much like the IP layer in typical computer networks.

Media access controller (MAC) layer 50 is the protocol layer below the network layer 40. MAC layer 50, in a general sense, is analogous with the data link layer of the OSI protocol model. MAC layer 50 is responsible for moving data to and from physical layer 70. More specifically, MAC layer 50, in the context of a cable modem, either receives data from the cable modem or transmits data to the CMTS over the cable modem. In part, this is accomplished by allocating a bandwidth, which refers to the rates and frequencies used in communications. MAC layer 50 typically provides a baseline privacy interface (BPI) and additional privacy is optionally provided.

As described previously, cable modems are currently stand-alone devices and include the hardware and software necessary to receive and transmit data over a cable network. As a result, the interface between the software and hardware of a cable modem varies among cable modems. The lack of uniformity has hindered the development of a self hosted cable modem. This non-uniformity is overcome by hardware abstraction layer (HAL) 60.

HAL 60 establishes a connection between MAC layer 50 and physical layer 70 and permits any host to operate with any cable modem, so long as the cable modem and associated software are compatible with hardware abstraction layer 60. HAL 60 is an application program interface (API), in one embodiment, that interfaces with MAC layer 50 and physical layer 70. Furthermore, HAL 60, in one embodiment is intended to separate the physical layer from a software layer. In effect, HAL 60 presents a defined interface to physical layer 70. Physical layer 70 processes the data received over the cable network such that it is compatible with HAL 60. HAL 60 is able to retrieve the information taken off the cable network by physical layer 70 and present it to the higher protocol layers. HAL 60 also functions to transfer data from MAC layer 50 to physical layer 70. In effect, HAL 60 replaces a top portion of physical layer 70 and a bottom portion of MAC layer 50.

Figure 5:
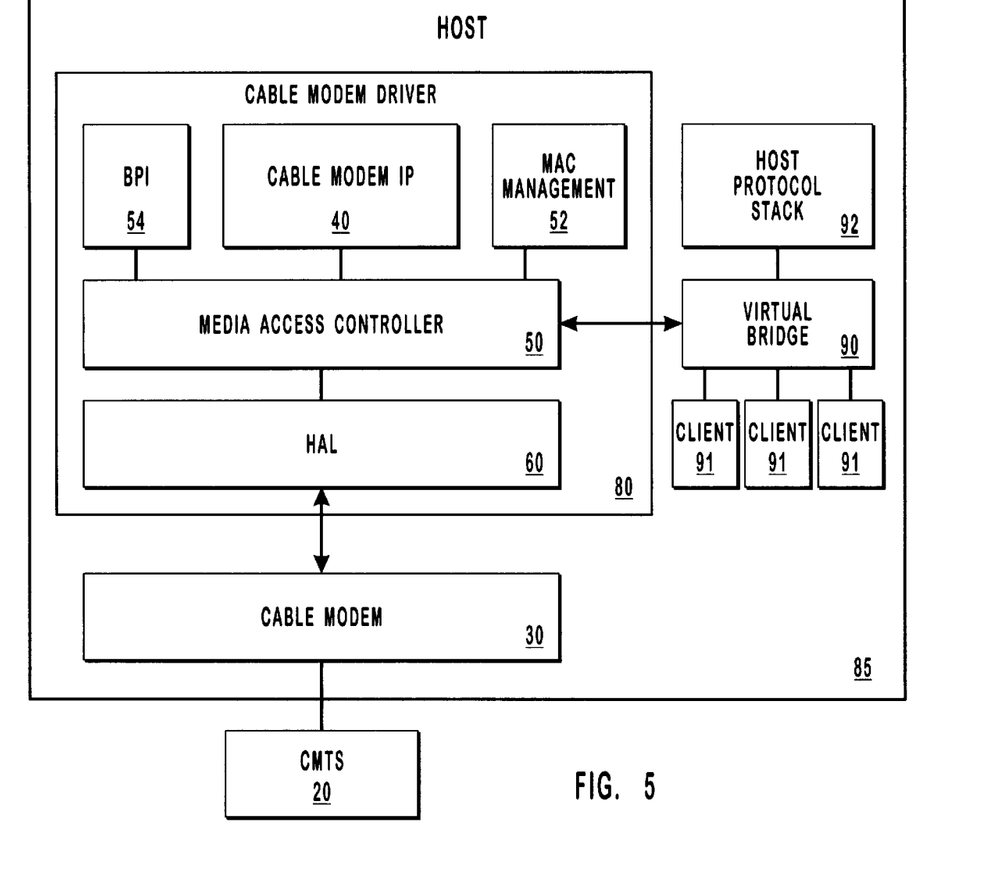
FIG. 5 is a detailed block diagram of a host having a cable modem driver implementing the protocol stack of the cable modem.

FIG. 5 is a more detailed illustration of one embodiment of a system integrating a cable modem with a CPE or host. Host 85 maintains separate the cable modem protocol stack from any the protocol stack associated with the operating system of the host. Host 85 has a cable modem driver 80, which is an exemplary method of implementing HAL 60, MAC layer 50 and, optionally, IP driver 40. Host 85, from the point of view of cable modem 30, is a CPE. Host 60 can be a computer, a set top box, a computer network, or any other CPE or system. Cable modem driver 80, however, shares the memory, CPU, and system resources of host 85 with other applications and connections.

HAL 60 is capable of interfacing with cable modem 30. HAL 60 requires that cable modem 30 process the data packets such that the data packets are compatible with HAL 60. HAL 60 retrieves the data packets from cable modem 30, processes the data packets and presents them to MAC layer 50. The functions executed by HAL 60 include handling packets and information retrieved from cable modem 30, handling MAC management messages, and initializing and controlling cable modem 30. HAL 60 executes the hardware related functions of cable modem driver 80 and exports its services to MAC layer 50.

As noted previously, HAL 60 facilitates the interoperability of cable modems with hosts by providing a standard interface. The non-uniformity of cable modems can be eliminated by the cable modems being manufactured to interface with HAL 60. In this manner, the exact method employed by a cable modem in retrieving the data packets from the cable network is no longer important to cable modem driver 80 because HAL 60 defines an interface between cable modem 30 and MAC layer 50. Thus, HAL 60 is essentially responsible for retrieving downstream data from cable modem 30 and presenting that data to MAC layer 50, and for placing upstream data from MAC layer 50 on cable modem 30.

MAC layer 50 functions as the DOCSIS compliant media access controller layer and comprises BPI 54 and MAC management 52. BPI 54 is defined by DOCSIS and is implemented in MAC layer 50. MAC management 52 handles all of the MAC management issues and implements the core of the DOCSIS specifications. MAC layer 50 primarily manages the sending and receiving of MAC management messages to and from MAC management 52; the sending and receiving of MAC management messages related to BPI 54 to and from BPI 54; the sending and receiving of MAC data packets to and from IP 40; and the sending and receiving of data packets intended for host 85 to and from virtual bridge 90. MAC layer 50 provides interfaces to virtual bridge 90 and IP 40 such that data packets can be sent and received across the cable network. Also, MAC layer 50 has the ability to control the function and physical behavior of cable modem 30. MAC layer 50 provides additional functions to HAL 60 which aid the transmission of packets from cable modem 30 to MAC layer 50 and from MAC layer 50 to cable modem 30.

Virtual bridge 90 is disclosed in greater detail in co-pending U.S. patent application Ser. No. 091371,914, entitled "Hosting a Cable Modem in a Computer Using a Virtual Bridge", which is incorporated herein by reference. In essence, virtual bridge 90 isolates cable modem 30 and cable modem driver 80 from host 85 and clients 91 such that they do not have direct access to the data packets, nor can host 85 alter the access controls of cable modem 30. As previously indicated, cable modem 30 has a separate protocol stack. Thus, even though cable modem 30 and cable modem driver 80 are integrated with host 8 and share resources, host 85 is still viewed as a CPE by cable modem 30 and modem management packed are sent to MAC management 53 rather than to host 85 or clients 91. In this manner, the advantages of an external modem are retained.

FIGS. 1–5 have been discussed primarily in terms of a CPE that hosts or is integrated with a cable modem. In another embodiment, the cable modem is not integrated with the CPE, but is separate. In this embodiment, the cable modem typically has a separate processor from that of the CPE. HAL 60, in this embodiment, however functions as described herein. HAL 60 essentially separates the functionality of the cable modem from the software implementation of MAC layer 50. Because HAL 60 provides or functions as an interface between the cable modem and MAC layer 50, the cable modem is capable of being developed independently of MAC layer 50. Similarly, MAC layer 50 is capable of being enhanced independently of the cable modem. In this manner, the proprietary aspects of the cable modem and MAC layer 50 are protected.

Figure 6:
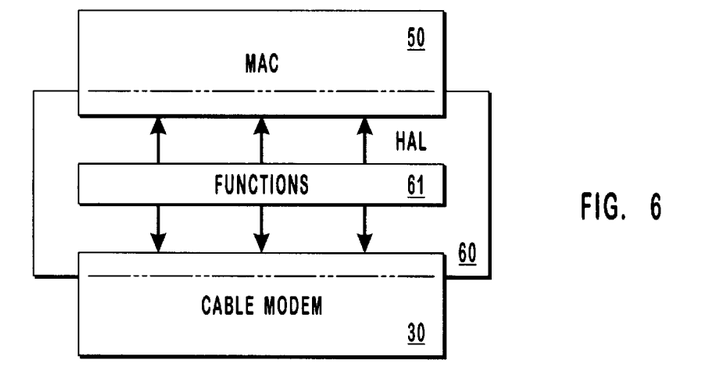
FIG. 6 is a block diagram illustrating an exemplary implementation of a hardware abstraction layer as an application program interface.

FIG. 6 is a block diagram illustrating an exemplary implementation of HAL 60 as an application program interface (API). HAL 60 is an interface than connects cable modem 30 with MAC layer 50. A portion of the protocol of cable modem 30 is implemented by HAL 60 and a portion of the protocol of MAC layer 50 is implemented by HAL 60, More specifically, MAC layer 50 implements the DOCSIS MAC protocol and HAL 60 functions as the driver for DOCSIS compliant hardware. In this manner, HAL 60 provides an interface to which both cable modem 30 and MAC layer 50 may connect. Once cable modem 30 is connected to MAC layer 50 via HAL 60, data packets are transferred from cable modem 30 to MAC layer 50 and vice versa. Cable modem 30 may process the data packets such that they are compatible with HAL 60 and in turn, HAL 60 prepares the data packet for transmission to MAC layer 50. HAL 60 also functions to place data packets provided by MAC layer 50 on cable modem 30.

In a general sense, an API provides functions, routines, protocols and tools for building software and software-related applications An API allows applications, drivers, and other software to be written consistently with other software that interfaces with the API. The host side implementation of MAC layer 50, while not covered by DOCSIS specifications, nonetheless substantially complies with those specifications. HAL 60 permits cable modem 30 to seamlessly connect with MAC layer 50 by providing a set of functions and routines which can be utilized by cable modem 30 and by MAC layer 50. HAL 60, as an API permits cable manufactures to create modems which function in more than one type of host computer because HAL 60 provides a constant interface.

HAL 60 comprises functions 61, which are used by MAC layer 50 and cable modem 30 to communicate and transfer data packets. In general, functions 61 provide at least three areas of functionality: providing functions for initializing and controlling cable modem 30; providing functions for handling user data packets, which are routed to the CPE by MAC layer 50; and providing functions for handling messages or data packets intended for MAC management. HAL 60 abstracts control of cable modem 30 to MAC layer 50. Some of these functions are detailed in the following paragraphs. In addition, the following paragraphs describe functions associated with a hardware abstraction layer API according to one embodiment of the invention.

CmHalDriverEntry is a function that registers HAL 60 with MAC layer 50. Once HAL 60 is registered with MAC layer 50, MAC layer 50 passes or provides HAL 60 with functions that enable HAL 60 to transmit user data packets and management data packets, which have been received by cable modem 30, to MAC layer 50. MAC layer 50 also provides functions to HAL 60 that indicate whether a packet transmission has been successful. CmHalInitHandler is used by MAC layer 50 to allow HAL 60 to initialize its adapter to be ready for cable network communications. After the cable modem or other hardware components have been initialized, MAC layer 50 begins the DOCSIS initialization procedure where CMHalScanDSChannelHandler is used to scan for a valid downstream frequency. CMHalScanDSChannelHandler returns the downstream frequency that it found or returns a failure to find a downstream frequency.

CMHalSetInfoHandler enables MAC layer 50 to write onto various hardware registers of cable modem 30. CMHalQueryInfoHandler provides MAC layer 50 with the ability to query information from cable modem 30. CMHalSetModeHandler enable MAC layer 50 to write to hardware registers of cable modem 30 and set modes of cable modem 30. CmHalQueryModeHandler enables MAC layer 50 to query hardware modes.

CmHalReleaseMagmtMsgHandler permits MAC layer 50 to inform HAL 60 that a particular management data packet has been used by MAC management and can be released from storage. CMHalReleaseDataPacketHandler permits MAC layer 50 to inform or instruct HAL 60 that a particular user data packet has been used or consumed and that the user data packet can be released from storage or from a buffer. CMHalSendMgmtMsgHandler is a function that is called by MAC layer 50 to send a management data packet upstream to the CMTS. CMHalSendDataPacketHandler is a function that MAC layer 50 utilizes to send a user data packet upstream.

Details regarding an exemplary application program interface that can be used to implement the hardware abstraction layer according to one embodiment of the invention is disclosed in co pending U.S. patent application Ser. No 09/371,419, entitled "Application Program Interface for Abstracting Control of a Cable Modem", which is incorporated herein by reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computing system configured to process data packets that are transmitted over a cable network, the computing system comprising:
    a cable modem for communicating data packets over the cable network,
    customer premises equipment that is configured to host the cable modem; and
    a cable modem protocol stack that includes:
        a physical layer comprising the cable modem;
        a data link layer comprising a media access controller; and
        a hardware application layer comprising an application programming interface that is disposed between the physical layer and the data link layer and that is configured for transmitting data packets between the cable modem and to the media access controller, and for separating hardware of the cable modem from software of the cable modem protocol stack.

2. A system as defined in claim 1, wherein the customer premises equipment comprises a computer.

3. A system as defined in claim 1, wherein the customer premises equipment comprises a set top box.

4. A system as defined in claim 1, it wherein the customer premises equipment shares resources with the cable modem.

5. A system as defined in claim 1, wherein the customer premises equipment is integrated with the cable modem.

6. A system as defined in claim 1, wherein the a cable modem protocol stack for the cable modem is separate from a customer premises equipment protocol stack associated with the customer premises equipment.

7. A system as defined in claim 1, wherein the application programming interface permits the media access controller to control the operation of the cable modem.

8. A system as defined in claim 1, wherein the application programming interface initializes the cable modem.

9. In a system having a cable modem that is configured to be hosted by customer premises equipment and that represents the physical layer of a cable modem protocol stack, wherein the customer premises equipment includes a media access controller that represents the data link layer of the cable modem protocol stack, a method for transmitting a data packet between the cable modem and the media access controller, the method comprising the steps of:
    for an outgoing data packet:
        preparing, by the media access controller, the outgoing data packet such that the outgoing data packet is compatible with hardware interface layer that is disposed between the data link layer and the physical layer of the cable modem protocol stack the hardware interface layer comprising an application programming interface configured for separating hardware of the cable modem from software of the cable modem protocol stack;
        transmitting the outgoing data packet from the media access controller to an interface of the hardware interface layer; and
        placing, by the interface, the outgoing data packet on the cable modem; and
    for an incoming data packet:
        transmitting the incoming data packet with the cable modem from the physical layer to the hardware interface layer;
        receiving, at the interface in the hardware interface layer, the incoming data packet from the cable modem; and
        transmitting, by the interface, the incoming data packet to the media access controller in the data link layer.

10. A method as defined in claim 9, further comprising the step of providing control of the cable modem to the media access controller.

11. A method as defined in claim 9, further comprising the step of scanning for a communication channel using the cable modem.

12. A method as defined in claim 9, further comprising the step of initializing, by the media access controller, the cable modem.

13. A method as defined in claim 9, further comprising the step of providing exporting functions, by the interface, to the media access controller.

14. A method as defined in claim 9, further comprising the step of implementing, by the interface, a portion of a cable modem protocol stack.

15. A computer program product for use in a system having a cable modem that is configured to be hosted by customer premises equipment and that represents the physical layer of a cable modem protocol stack, wherein the customer premises equipment includes a media access controller that represents the data link layer of the cable modem protocol stack, the computer program product having computer-executable instructions for implements a method for transmitting a data packet between the cable modem and the media access controller, the method comprising:

for an outgoing data packet:
preparing, by the media access controller, the outgoing data packet such that the outgoing data packet is compatible with a hardware interface layer that is disposed between the data link layer and the physical layer of the cable modem protocol stack, the hardware interface layer comprising an application programming interface configured for separating hardware of the cable modem from software of the cable modem protocol sack;
transmitting the outgoing data packet from the media access controller to an interface of the hardware interface layer; and
placing, by the interface, the outgoing data packet on the cable modem; and for an incoming data packet:
transmitting the incoming data packet with the cable modem from the physical layer to the hardware intense layer;
receiving, at the interface in the hardware interface layer, the incoming data packet from the cable modem; and
transmitting, by the interface, the incoming data packet to the media access controller in the data link layer.

16. A computer program product as defined in claim 15, wherein the method further comprises an act of providing control of the cable modem to the media access controller.

17. A computer program product as defined in claim 15, wherein the method further comprises an act of scanning for a communication channel using the cable modem.

18. A computer program product as defined in claim 15, wherein the method further comprises an act of initializing, by the media access controller, the cable modem.

19. A computer program product as defined in claim 15, wherein the method further comprises an act of providing exporting functions, by the interface, to the media access controller.

20. A computer program product as defined in claim 15, wherein the method further comprises an act of implementing, by the interface, a portion of a cable modem protocol stack.

* * * * *

UNITED STATES PATENT AND TRADEMARK OFFICE
CERTIFICATE OF CORRECTION

PATENT NO. : 6,618,387 B1
DATED : September 9, 2003
INVENTOR(S) : Liu et al.

It is certified that error appears in the above-identified patent and that said Letters Patent is hereby corrected as shown below:

Column 7,
Line 66, after "reasons why" please delete "a"

Column 9,
Line 58, after "Ser. No." please delete "091371,914," and insert -- 09/371,914, --
Line 67, after "with host" please delete "8" and insert -- 85 --

Column 10,
Line 3, after "management" please delete "53" and insert -- 52 --
Line 23, after "interface" please delete "than" and insert -- that --
Line 26, after "HAL 60" please delete "," and insert -- . --

Column 11,
Line 56, after "network" please delete "," and insert -- ; --

Column 12,
Line 1, after "modem and" please delete "to"
Line 8, after "claim 1," please delete "it"
Line 12, after "wherein the" please delete "a"
Line 32, after "compatible with" please insert -- a --
Line 34, after "protocol" please insert -- , --

Column 13,
Line 8, after "instructions for" please delete "implements" and insert -- implementing --

Signed and Sealed this

Twenty-second Day of June, 2004

JON W. DUDAS
*Acting Director of the United States Patent and Trademark Office*